US00RE42552E

(19) United States
(12) Reissued Patent
Reid

(10) Patent Number: US RE42,552 E
(45) Date of Reissued Patent: Jul. 19, 2011

(54) DRY BREAK COUPLING ASSEMBLY

(75) Inventor: Aaron Reid, Jamestown, IN (US)

(73) Assignee: Banjo Corporation, Crawfordsville, IN (US)

(21) Appl. No.: 11/844,636

(22) Filed: Aug. 24, 2007

Related U.S. Patent Documents

Reissue of:
(64) Patent No.: 6,945,273
Issued: Sep. 20, 2005
Appl. No.: 10/957,168
Filed: Sep. 30, 2004

(51) Int. Cl.
*F16L 37/373* (2006.01)

(52) U.S. Cl. ..... 137/614.06; 251/149.9; 285/320; 285/420

(58) Field of Classification Search ..... 137/614.06, 137/614.01, 614.02; 251/149.9; 285/320, 285/420
See application file for complete search history.

(56) References Cited

U.S. PATENT DOCUMENTS

| | | | | |
|---|---|---|---|---|
| 2,440,946 | A | 5/1948 | Hansen | |
| 2,677,558 | A * | 5/1954 | Cornelius | 285/320 |
| 2,765,183 | A | 10/1956 | Mahoney | |
| 4,103,712 | A * | 8/1978 | Fletcher et al. | 137/614.06 |
| 4,664,149 | A | 5/1987 | Fremy | |
| 5,595,217 | A | 1/1997 | Gillen et al. | |
| 5,911,445 | A | 6/1999 | Lee | |
| 6,050,545 | A | 4/2000 | Stolzman | |
| 6,290,267 | B1 | 9/2001 | Swingley | |

FOREIGN PATENT DOCUMENTS

| | | |
|---|---|---|
| DE | 10 60 202 B | 6/1959 |
| DE | 1060202 | 6/1959 |
| EP | 0 638 753 A | 2/1995 |
| EP | 0638753 | 2/1995 |
| FR | 2 523 261 A | 9/1983 |
| FR | 2523261 | 9/1983 |

OTHER PUBLICATIONS

European Search Report for Application No. 04036070, Dec. 10, 2004, 2 Pages, European Patent Office, Europe.

* cited by examiner

*Primary Examiner* — Kevin L Lee
(74) *Attorney, Agent, or Firm* — Baker & Daniels LLP

(57) ABSTRACT

A dry break coupling assembly for interconnecting components of a fluid handling system. The coupling assembly includes first and second valves, each includes a rotatable valve element for opening and closing a fluid passageway within a valve body. The over-center clamp mechanism is for interlocking the first and the second valves when the valves are in a connected arrangement, allowing the valves to be easily disconnected when the valves are in a closed position, having a pair of projecting bars disposed on an outer surface of a body of a first valve and a pair of clamp assemblies disposed on a body of the second valve. Each clamp assembly includes a clamp arm having a hook end for engaging one of the projecting bars, and a clamp lever for actuating the hook end to engage or disengage the projecting bar. A yoke assembly is for operatively locking the over-center clamp when the second valve is in an open position, and an automatic locking assembly on each valve for locking the valve into a closed position when they are disconnected.

21 Claims, 6 Drawing Sheets

DRY BREAK COUPLING ASSEMBLY

Matter enclosed in heavy brackets [ ] appears in the original patent but forms no part of this reissue specification; matter printed in italics indicates the additions made by reissue.

TECHNICAL BACKGROUND

1. Field of the Invention

The present invention relates to a coupling assembly for components of a fluid handling system, and, in particular, to a dry break coupling assembly which has a minimal tendency to spill conveyed fluid when disconnected.

2. Description of the Related Art

Coupling assemblies are utilized to provide ready connection and disconnection of multiple components, such as separate hoses or a hose and a tank, of a fluid handling system. In many situations, the fluid being conveyed or retained within the fluid-handling system is potentially harmful to the environment or to the user of the coupling assembly. Such fluids include pesticides, fertilizers, gasoline or flammable fluids, and a variety of toxic substances. The coupling assemblies preferably utilized with such liquids are known as dry disconnect or dry break coupling assemblies and can be connected and disconnected with minimal or zero fluid spillage.

A variety of different types of dry disconnect coupling assemblies are already known in the art. One type of dry break coupling includes spring biased popper valves mounted in the separate coupling halves. These poppet valves are opened and closed to control fluid flow through the coupling assembly by a plunger axially shiftable within one of the coupling halves. One disadvantage of this coupling configuration is an appreciable pressure drop over the length of the coupling results from the presence of the valve elements interposed within the flow path of the fluid.

Another type of dry disconnect coupling device, such as disclosed in U.S. Pat. No. 4,664,149, is automatically opened and closed when the separate coupling halves of the coupling are connected and then disconnected. While useful in some applications, these devices are complicated in design and manufacture, which may undesirably increase their cost. Furthermore, these devices may be inconvenient to use in situations where selective control or stoppage of the fluid flow during liquid transfer is desirable.

Other types of dry disconnect coupling assemblies, such as disclosed in U.S. Pat. No. 2,440,946, utilize two interfitting rotary valve elements such as ball valves. While functional to provide a dry disconnect, known devices of this type are not without their shortcomings. In some prior art designs, the mechanical linkage by which the separate coupling halves can be connected, or the manner in which the sequencing of the opening and closing of the valves is controlled, is not especially user friendly or intuitive to a user. For example, some valves require that the separate valves first be axially shifted together and then rotated relative to one another such that the camming members on one of the valves engage complementary elements on the other valve. The operation of this connection system may be confusing to some users who need to experiment to determine which way the valves need to be rotated to effect connection and subsequent disconnection. In addition, in some valves an absent-minded user can accidentally turn on the valves when they are disconnected and an unfortunate spill of potentially harmful fluids may occur.

Thus, it would be desirable to provide a dry break coupling assembly which overcomes shortcomings of these and other prior art systems.

SUMMARY OF THE INVENTION

The present invention involves a dry break coupling assembly for interconnecting and controlling fluid flow between first and second components in a fluid handling system using the coordinated interlocking of valve elements. The coupling assembly comprises a first valve attachable to the first fluid handling system component. The first valve includes a body having a valve connection end, and a fluid passageway. The first valve also includes a valve element rotatably supported within the body. The assembly further includes a second valve attachable to the second fluid handling system component. The second valve includes a body having a valve connection end and a fluid passageway. A second valve element is rotatably supported within the body of the second valve. Both valve elements are rotatable between an open position and a closed position when the valve bodies are connected by the over-center clamp mechanism.

The first valve and the second valve are movable relative to each other between a disconnected arrangement and a connected arrangement, wherein the valve connection ends of the first and second valves are disposed in facing relationship when the first valve and the second valve are disposed in the connected arrangement.

Also included in the coupling assembly of the present invention is an over-center clamp mechanism for interlocking the first valve to the second valve when the first valve and the second valve are disposed in the connected arrangement.

In one form of the invention, the first and second valve are rotatable with respect to one another for up to 20 degrees in either direction, when the first valve and the second valve are disposed in the connected arrangement.

In a specific embodiment, the over-center clamp mechanism comprises: a pair of projecting bars disposed on an outer surface of the body of the first valve, and a pair of clamp assemblies disposed on the body of the second valve. Each clamp assembly may include a clamp arm having a hook end for engaging one of the projecting bars, and a clamp lever for actuating the hook end to engage or disengage the projecting bar.

In another specific embodiment, the clamp assembly is operatively connected to a yoke assembly mounted on the body of the second valve for locking the clamp lever in a locking position when the second valve is in an open position. The yoke assembly comprises means for biasing the yoke assembly when the yoke assembly disengages the second valve handle as the second valve assumes a closed position.

In another form of the present invention, each of the valves comprise an automatic locking assembly. The locking components of the first and the second valves engage each other during connection of the first and second valves. The locking component comprises a locking button received within a body cavity and projecting forward of the valve connection end.

BRIEF DESCRIPTION OF THE DRAWINGS

The above-mentioned and other features and advantages of this invention, and the manner of attaining them, will become more apparent and the invention itself will be better understood by reference to the following description of embodiments of the invention taken in conjunction with the accompanying drawings, wherein.

Figure 1:
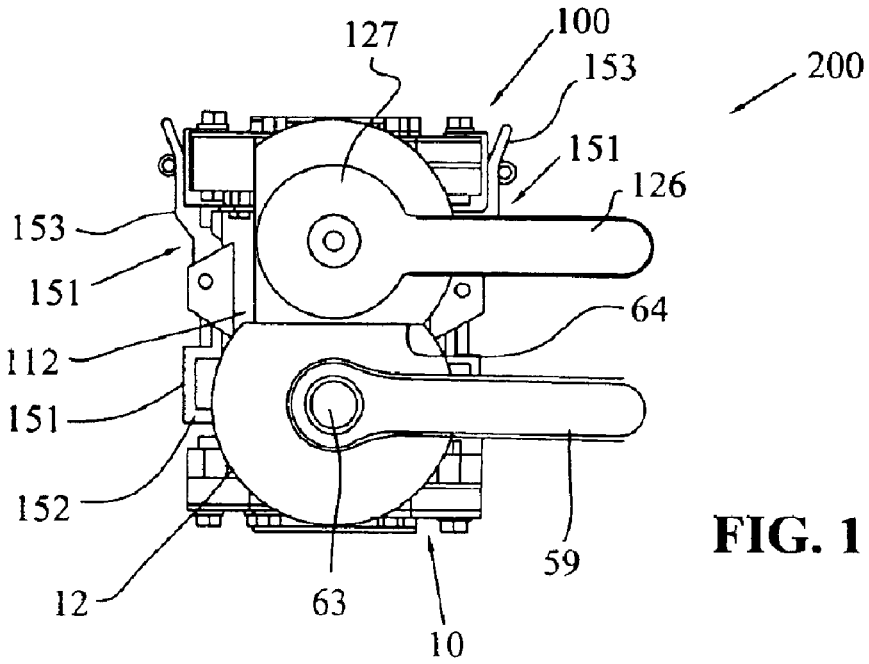
FIG. 1 is a top elevational view of one embodiment of the dry coupling assembly of the present invention, the dry coupling assembly is in a connected position.

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates an embodiment of the invention, in one form, and such exemplifications are not to be construed as limiting the scope of the invention in any manner.

DETAILED DESCRIPTION OF THE INVENTION

The disconnect assembly of the present invention is designed and manufactured to provide a dry break connection, which refers to the valves having a minimal if not zero tendency to drip or spill fluid when disconnected from a connected, fluid conveying arrangement. The disconnect assembly is therefore particularly suited for liquid handling systems utilized with fluid materials for which accidental spillage or drippage should be kept to a minimum, such as with pesticides or fertilizers, flammable materials, chemicals or toxic substances.

Shown in FIG. 1 is an exemplary embodiment of the dry disconnect assembly of the present invention. In this embodiment, disconnect assembly 200 includes a pair of cooperating valves, generally designated 10 and 100. Valves 10 and 100 can be mounted to separate components of a liquid handling system, and can then be connected together to provide a convenient, fluid-tight communication between the valves and between the valves and the components. Valves 10 and 100 further allow for quick disconnect from one another.

Figure 2:
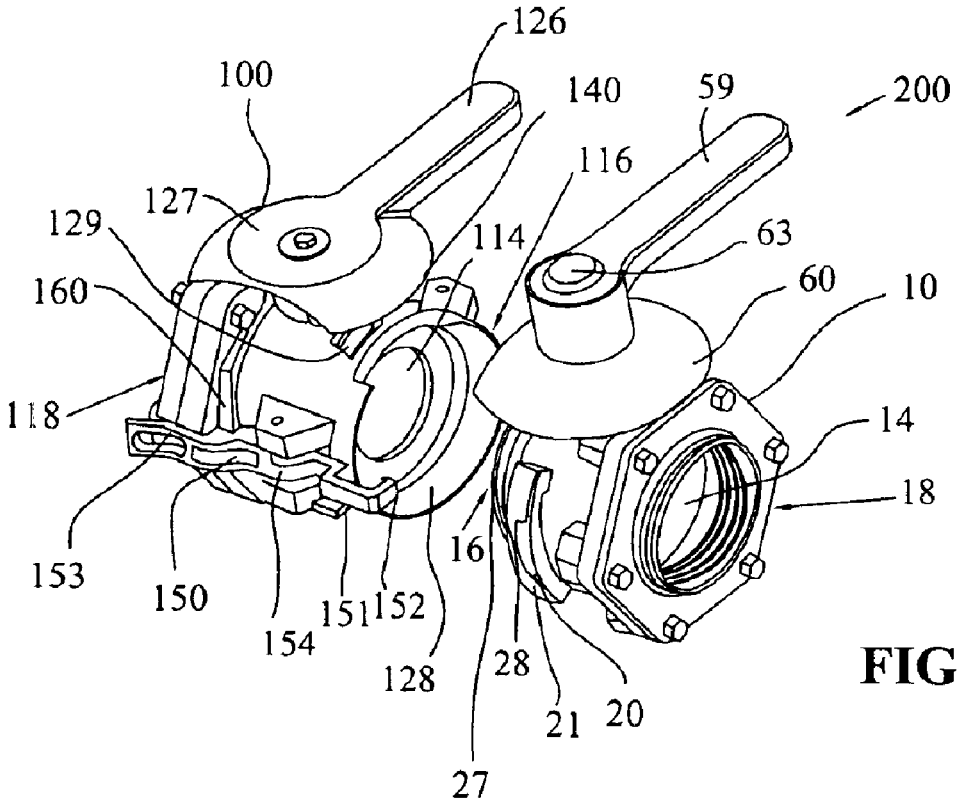
FIG. 2 is a side perspective view of the dry coupling assembly of FIG. 1, the dry coupling assembly is in a disconnected position.

In the shown embodiment in FIGS. 1 and 2, valve 10 and valve 100 include male and female type constructions that cooperate to facilitate a proper rotational and axial alignment of the valves during their interconnection. Accordingly, valves 10 and 100 may be referred to herein as male and female valves, respectively. Male valve 10 includes male body 12 and female valve 100 includes female body 112. Bodies 12 and 112 are provided with a pair of over-center clamp mechanisms 150 for interlocking the bodies into a connected position and for quick disconnecting the bodies into a disconnected position.

Figure 4:
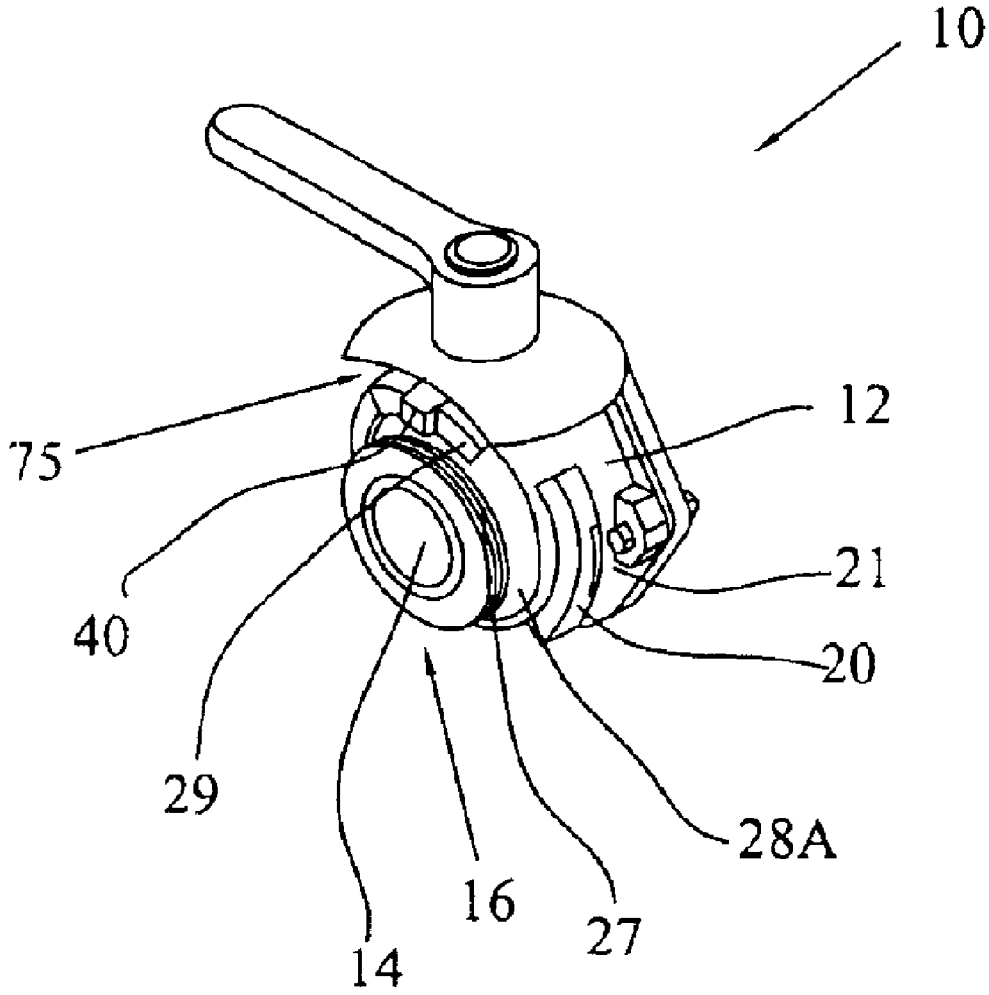
FIG. 4 is a side perspective view of a male valve according to the embodiment in FIG. 1.

As shown in FIGS. 1-2, and 4, male body 12 is generally tubular with interior cavity or fluid passageway 14 that longitudinally or axially extends from a forward, valve connection end 16 which is generally planar in this embodiment to a rearward, conduit fitting end 18. Body 12 defines collar 28 projecting from forward end 16. O-ring 27 may be provided around collar 28 for sealing the connection of the valves when valve bodies 12 and 112 are connected, or alternatively a groove and o-ring may be on the female body (not shown). Collar 28 may define grooves 28A (see FIG. 4) for receiving O-ring 27 in the manner known in the art. As used herein, forward and rearward are individually referenced for each valve, and the forward direction refers to the axial direction in which a given valve is moved toward a cooperating valve for fluid conveying interconnection therewith. The rearward direction similarly refers to the axial direction in which a given valve is pulled away from a cooperating valve, for example during disconnection of valves 10, 100.

As shown in FIGS. 2 and 4, body 12 defines a pair of radially projecting bars 20 which are spaced approximately 180° apart around the body circumference. Projecting bars 20 may be integrally formed with body 12 or may be attached to body 12 by a fastening means such as multiple screws. Each bar 20 defines recess 21. Body 12 may be molded from fiberglass reinforced polypropylene to provide both high strength and durability. Other materials of construction for the body, including stainless steel, may alternatively be employed.

Figure 5:
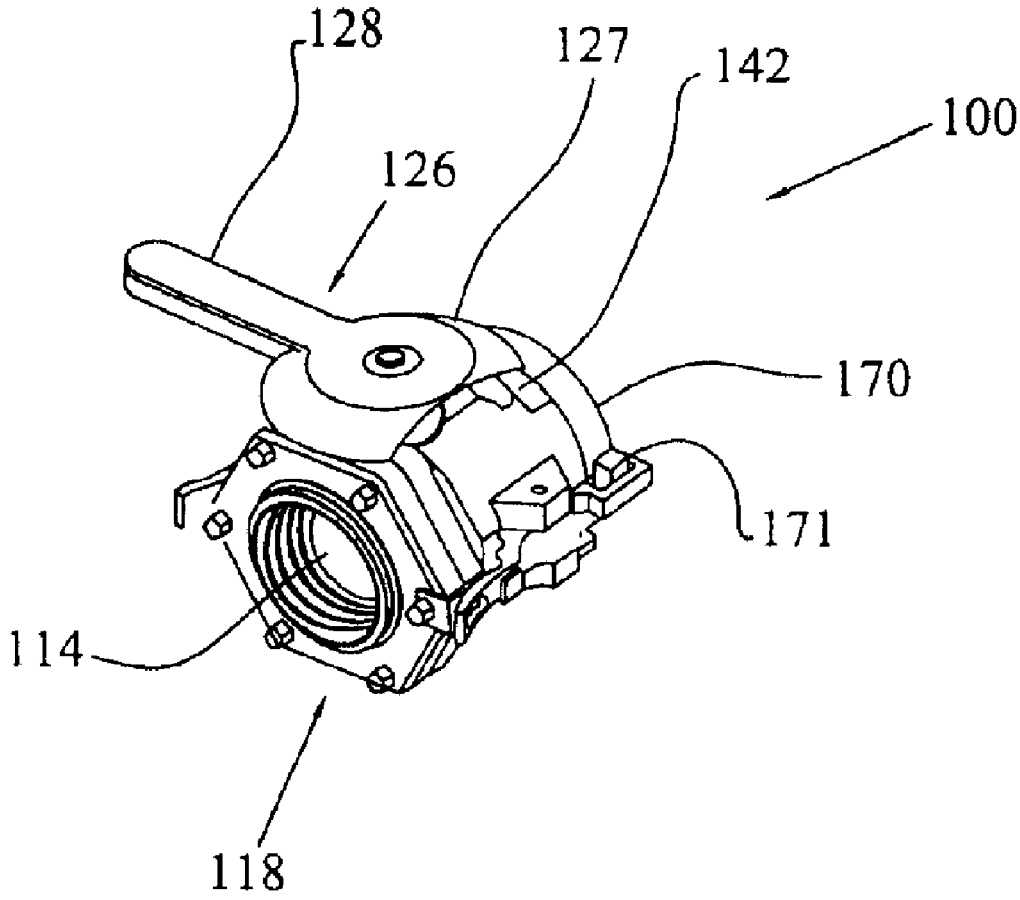
FIG. 5 is a side perspective view of a female valve according to the embodiment in FIG. 1.

As further illustrated in FIGS. 1-2 and 5, female body 112 may also be generally tubular with bore 114 that longitudinally or axially extends from a forward, valve connection end 116 which is generally planar in this embodiment to a rearward, conduit fitting end 118. Body 112 may be molded from fiberglass reinforced polypropylene. Integrally formed with body 112 is valve alignment skirt 128 projecting forwardly from female body 112 complementarily to collar 28 of male body 12 so as to closely fit over the exterior surface of collar 28 when the forward portion of male valve 10 is inserted during valve connection. Skirt 128 defines gap 129 sized and arranged to receive shoulders 29 of male valve body 12 and male interlock button 40 (see FIG. 5).

As further shown in FIGS. 1, 2, and 5, female body 112 further defines a pair of over-center clamp mechanism 150, positioned at about 180° apart around the body circumference. Each of over-center clamp mechanism 150 includes clamp arm 151 defining hook end 152 for engaging radially projecting bars 20 provided on male valve 10. Clamp lever 153 is cooperatively connected to clamp arm 151 at opposite end 154. Clamp arm 151 extends beyond body 112 so that when body 112 is mated with body 12, clamp hook may clasp on projecting bar 20 of male body 12.

The structure of the disconnect assembly of the present invention will be further understood in view of the following explanation of its use to couple together and then decouple components of a fluid handling system. In FIG. 2, valves 10 and 100 are shown disconnected and without the fluid handling system components to which they are releasably attached with their provided fittings. When the valves are not connected, handles 59 and 126 are each disposed in the shown transverse position such that the valves are closed to prevent spillage of fluid. The locking assemblies including the forwardly-biased locking buttons 40 and 140 prevent their respective valve handles from being accidentally moved to an open position which would allow fluid to spill from the disconnected valves. To connect valve 10 to valve 100, bodies 12 and 112 are aligned axially, having forward ends 16 and 116 facing one another. Shoulders 29 and button 40 of body 12 are aligned with gap 129. Collar 28 of body 12 is inserted into skirt 128 until hook end 152 snaps into recess 21 of projecting bar 20, and shoulders 29 and button 40 fit over gap 129.

To lock over-center clamp mechanism 150 in place, once each hook end 152 of the two lever arms 151 is in a proper position within recess 21, clamp lever 153 is pressed down against female body 112, a spring motion is created such that hook end 152 of clamp arm 151 is pressed down on projecting bar 20. The over-center clamp mechanism 150 is now locked in place.

During the mating together of valves 10, 100, locking buttons 40, 140 of the valves 10 and 100 abut each other and are each driven rearwardly within their respective body hollows. This locking button translation forces the handle engaging members of the locking assemblies into the grooves in their respective valve handles, which in turn permits handle rotation. The coupling assembly is now ready for operation to control the fluid flow between the linked handling system components.

Figure 3:
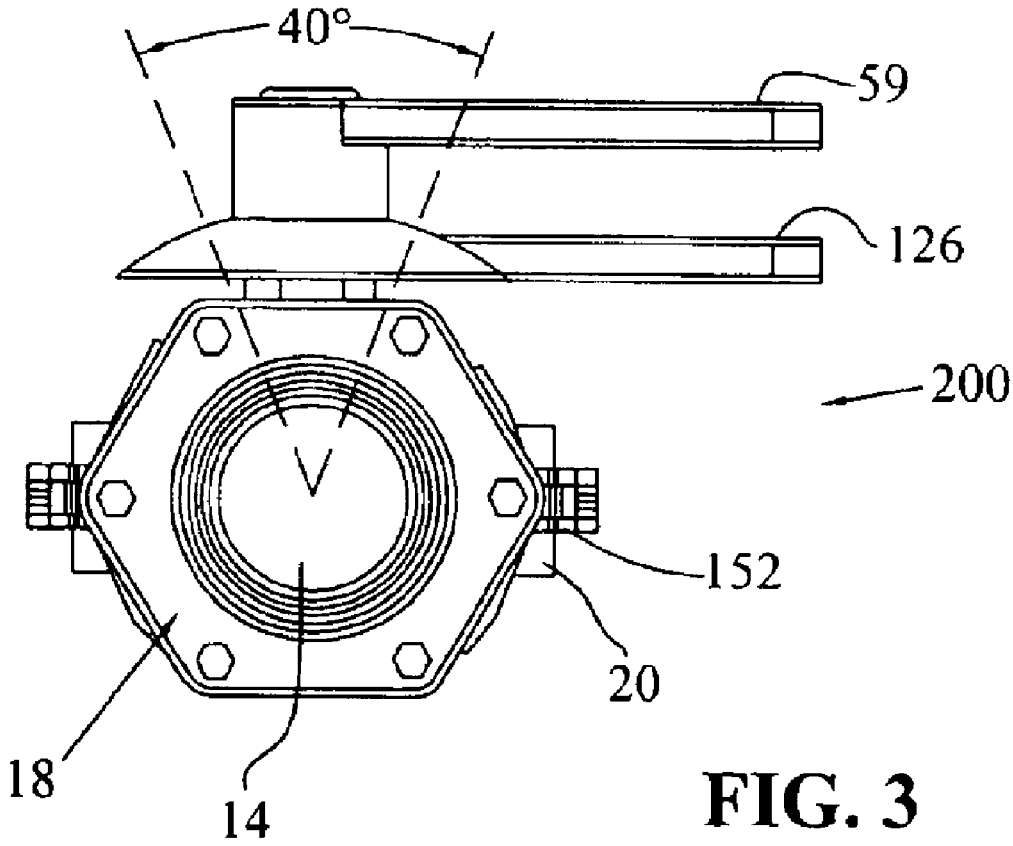
FIG. 3 is a back elevational view of the embodiment of the dry coupling assembly of FIG. 1.

One advantageous feature of the present disconnect assembly is that either body 12 or body 112 may be rotated in either direction at 20° in each direction, or 40° total (see FIG. 3), prior to being locked in place. In order to allow the rotation, recess 21 extends along projecting bar at a length that allows hook end 52 to move along the length of recess 21. In addition, gap 129 is also configured to allow the rotating movement of shoulders 29 and interlock button 40 (see FIG. 4) with gap 129. The allowable rotation is limited to 20° in each direction to prevent either lock button to be released such that either valve becomes open, while the valves 10 and 100 are being connected or disconnected.

The rotatable feature of valve 10 and 100 allows either or both valves to be rotated and easily connected to or disconnected from one another, while either one or both valves are connected to a fixed fluid system.

As shown in FIG. 2, further provided is a pair of locking yoke assembly 160 which fits over and closely conforms to the general profile of valve body 112. Yoke assembly 160 is designed to engage handle 59 and over-center clamp mechanism 150 in the manner known in the art or as described in U.S. Pat. No. 5,595,217, to prevent disconnection of valve bodies 12 and 112, when handle 59 is in the open position. Other locking members cooperatively designed with the over-center clamp mechanism to prevent the over-center clamp mechanism from pivoting away from body 112 in releasing the valve bodies while handle 59 of valve 100 is in the open position may be substituted within the scope of the invention.

To disconnect valves 10 and 100, clamp lever 153 is lifted, biasing hook end 152 to be released from bar 20. Valve bodies 12 and 112 may then be pulled apart.

Referring to FIG. 1, the transverse orientation of valve handles 59 and 126 relative to the valve bodies 12 and 112 is a conventional, visible indication to a user of the valves being closed. However, when male valve 10 and female valve 100 are connected, the valves may be opened in the manner well understood in the art.

Within interior cavity 14 of male body 12 includes a valve element which may be rotatable to open and close valve 10 to control the flow of fluid through body cavity 14. The features and functions of the valve element of the present invention may be as described in U.S. Pat. No. 5,595,217, which has been assigned to the present assignee, and herein fully and explicitly incorporated by reference. It is contemplated that other types of valve elements such as that disclosed in U.S. Pat. No. 6,050,545, assigned to the assignee of the present invention, the disclosure of which is incorporated by reference, may also be used.

Figure 6:
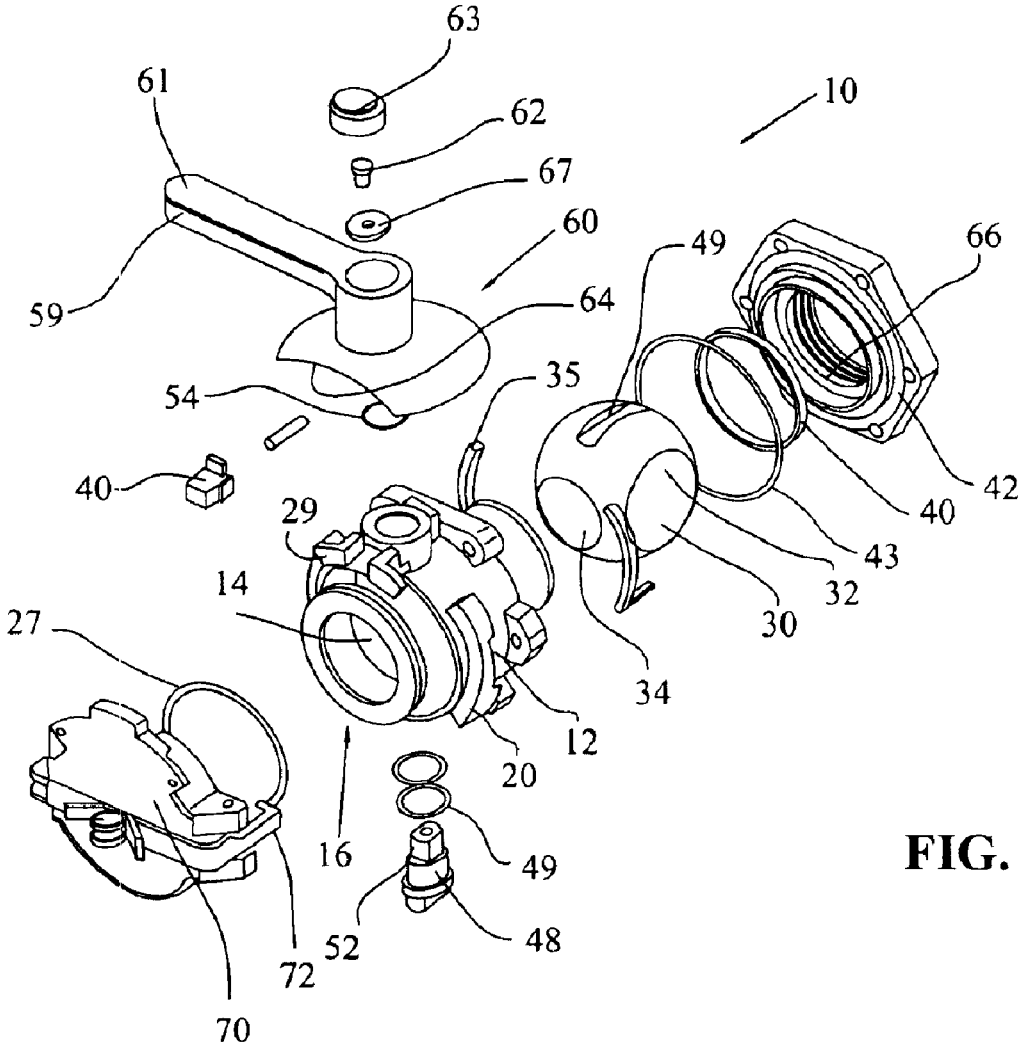
FIG. 6 is an exploded perspective view of a male valve according to another embodiment of the present invention.

For example, as shown in FIG. 6, valve element 30 is a ball type element which is generally spherical in shape and made of a plastic material, such as polypropylene or a metal material, such as stainless steel. Ball valve 30 includes a diametrical, cylindrical bore 32 and a concave recess 34 which is perpendicularly disposed relative to bore 32. When valve handle 59 is oriented in its closed position as shown in FIGS. 1 and 2, bore 32 is transversely oriented, and recess 34 is centered within the opening into body cavity or passageway 14 at valve connection end 16 and faces forward toward the female valve 100 engagable with valve 10. To aid in preventing fluid flow past a closed ball valve 30, annular seal 37 is provided on the valve connection side of ball valve 30 and annular seal 40 is provided on the conduit fitting side of ball valve 30. Seal 37 may be made of Teflon™ or other sealing materials known in the art. Seal 37 sealingly engages the exterior surface of ball valve 30. An additional seal (not shown), which may be made of Viton™, may be sandwiched between seal 37 and annular, internal shoulder 41 of body 12, which axially projects forward of the surface of valve connection end 16. Ring-shaped Teflon™ seal 40 is seated on a retaining plate 42, which has an axial throughbore. Retaining plate 42 is engaged to body 12 by clamp ribs 35. O-ring 43 is provided to seal the connection between retaining plate 42 and body 12. It is possible that the engagement between retaining plate 42 and body 12 can be accomplished by other mechanisms, such as set screws. It is possible that retaining plate 42 can be screwed on body 12 during assembly of valve 10 with sufficient force such that the various seals are properly seated and in engagement with the ball valve and each other to provide fluid tight seals around ball valve 30.

A fitting permitting connection to a component of a liquid handling system is provided for valve 10 opposite the forward end to which valve 100 connects. In the shown embodiment, a female threaded fitting, generally designated 66, is provided on retaining plate 42. The exemplary fitting is one type suitable for use with male valve 10 and others may be substituted within the scope of the invention. For example, the body and fitting could be integrally formed. Moreover, differently sized and shaped fittings may be substituted.

Ball valve 30 is rotationally fixed with stem 48, which upwardly extends from ball valve 30 through a transverse bore provided in body 12. A keyed lower end (not shown) of stem 48 is nested within groove 49 provided in ball 30 such that rotation of stem 48 is transferred to ball valve 30. The upper end 52 of stem 48 is shaped to fit within a keyed hole in the head 60 of handle 59 to rotationally couple handle 59 with stem 48 and ball valve 30. Handle 59 also includes a manually graspable torque arm 61 which allows easier operation of the valve. Screw 62 engages an internally threaded metal plug 63 within stem upper end 52 and cooperates with washer 67 to keep handle 59 secured to stem 48. Annular bearing 54 may be made of Teflon™ and facilitates rotation of stem 48. A stem O-ring 49, which furnishes a fluid-tight seal around stem 48 to prevent fluid from escaping from passageway 14, is held in position by a bushing that contacts the underside of handle head 60.

As best shown in FIGS. 1 and 6, handle head 60 includes a cutoff portion designated 64. Cutoff portion 64 is structured complementary to female valve handle 126 and arranged on handle 59 to properly sequence the operation of the valve handles as described further below.

To prevent handle 59 from being rotated from a closed position to an open position when male valve 10 is not connected to a female valve 100 and thereby allowing fluid to spill out from the valve, a handle locking assembly may be provided as described in U.S. Pat. No. 5,595,217, assigned to the assignee of the present invention, the disclosure of which is incorporated by reference.

As best shown in FIG. 4, locking assembly 75 includes a locking button 40 disposed between shoulders 29 formed in the top of valve body 12. Locking button 40 is biased forward of shoulders 29 by a biasing element, for example a spring (not shown), such that locking button 40 may block the rotation of handle 59 from the closed position to the open position. When handle 59 is disposed in the closed position as shown in FIG. 1, biasing spring biases locking button 40 forward. When so arranged, handle rotation, and therefore opening of valve element 30, is prevented. When button 40 is compelled rearwardly, such as by contacting with a portion of female valve 100 during connection of valves 10, 100, or as contacting with locking button 140 of a locking assembly on female valve 100, button 40 is shifted rearward into an arcuate recess or groove (not shown) formed into the underside of handle head 60. The handle 59 may be rotated approximately 90° to an open position where it is in axial alignment with body 12.

Figure 7:
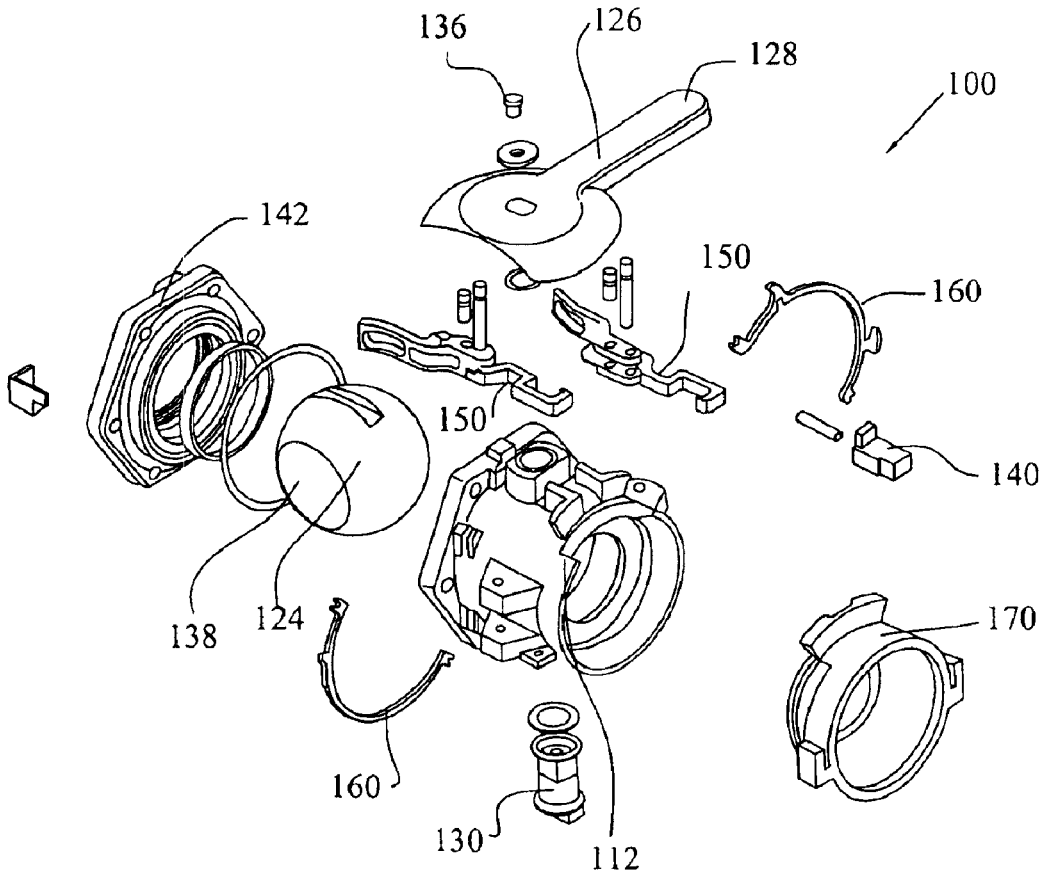
FIG. 7 is a partial exploded perspective view of a female valve according to another embodiment of the present invention.

Referring now to FIGS. 1, 2, 5 and 7, a construction of female valve 100, may be appreciated by those of skill in the art for being similar in many respects to male valve 10. Valve 100 includes handle 126, head 127 and a torque arm 128. Handle head 127 includes a concave recess 142 that is complementarily structured relative to male valve handle 59 and arranged on handle 126 to properly sequence valve handle operation. As shown in FIG. 7, ball valve element 124 within the interior cavity of valve body 112 is rotationally fixed to handle 126 by a keyed stem 130. Keyed stem 130 may be connected to handle 126 with screw 136. Seals disposed on the forward and rearward portions of valve element 124 provide a fluid tight seal around the valve element. Valve element 124 includes a diametrical bore 138 which is axially aligned when handle 126 is twisted to an open condition such that fluid may flow through female valve 100. As shown in FIGS. 1, 2, and 7, valve 100 further includes retaining plate 142 attachable to body 112, in the same manner as what is described for plate 42 of valve 10.

Due to the interlocking configuration of the handles, and as visibly apparent to a user, female valve handle 126 must be rotated prior to male valve handle 59. As female valve handle 126 is rotated to a full open position to axially align ball valve bore and open the fluid passageway, a cam (not shown) on the underside of handle arm 128 engages yoke assembly 160 and forces yoke 160 downward toward valve body 112 against the upward biasing force of an interposed spring. This locking engagement prevents clamp lever 153 from being pivoted forward to a release position, which in turn prevents a user from disconnecting valves 10, 100 when any of the valve 124 is in the open position.

After female valve handle 126 has been rotated, the male valve handle 59 is rotatable as handle recess 142 accommodates the curved exterior of handle head 60. After male valve handle 59 is rotated to rotate ball valve 30 into the full open position, valves 10 and 100 are both open to thereby allow fluid therethrough. Due to the interlocking configuration of handles 59, 126, male valve handle 59 must be closed prior to female valve handle 126 being closed.

Further provided, as shown in FIG. 6 is female cap 70 for providing protection of male valve 10, when male valve 10 is disconnected from valve 100. Female cap 70 is configured with over-center clamp 71, which is similar to what is described for over-center clamp mechanism 150. When cap 70 is placed over forward end 16 of valve 10, lever arm 72 of over-center clamp 71 may engage projecting bar 20 of valve 10 in the same manner as what is described for over-center clamp 150. Additionally, the release of lever arm 72 may also be performed in the same manner as what is described for over-center clamp 71.

Shown in FIGS. 5 and 7, similar to female cap 70, male cap 170 may also be provided for protection of valve 100. Male cap 170 is configured to be connectable to forward end 116 of valve 100. Male cap 170 defines projecting bar 171 for engaging hook end of 152 of over-center clamp 150.

While the present invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A dry break coupling assembly for interconnecting and controlling fluid flow between first and second components in a fluid handling system, the coupling assembly comprising:

a first valve attachable to the first fluid handling system component, said first valve including:

a first body defining a first valve connection end and a first fluid passageway, a first valve element rotatably supported within said first body, said first valve element rotatable between an open position and a closed position, a first handle operatively connected to said first valve element for rotating said first valve element between said open position and said closed position;

a second valve attachable to the second fluid handling system component, said second valve including:

a second body defining a second valve connection end and a second fluid passageway, a second valve element rotatably supported within said second body, said second valve element rotatable between an open position and a closed position, a second handle operatively connected to said second valve element for rotating said second valve element between said open position and said closed position, wherein said first valve and said second valve are movable relative to each other between a disconnected arrangement and a connected arrangement, wherein said first and second valve connection ends are disposed in facing relationship when said first valve and said second valve are disposed in said connected arrangement;

an over-center clamp mechanism for interlocking said first valve to said second valve when said first valve and said second valve are disposed in said connected arrangement, said over-center clamp *mechanism* being releasable when said first and second valve elements are disposed in the closed position, wherein when said over-center clamp mechanism is released, said first and said second valves are movable into the disconnected arrangement; and wherein said first and second valves are rotatable with respect to one another when said first valve and said second valve are disposed in said connected arrangement, *wherein said over-center clamp mechanism comprises:*

*a pair of projecting bars disposed on an outer surface of said first body of said first valve, each of said projecting bars defining a recess extending along a longitudinal length of said projecting bars;*

*a pair of clamps disposed on said second body of said second valve, each of said clamps including:*

*a clamp having an end adapted to engage or disengage said recesses of said projecting bars, and*

*wherein said end may translate within said recess such that said first and second valves are rotatable with respect to one another when said first valve and said second valve are disposed in said connected arrangement.*

2. The dry break coupling assembly of claim 1, wherein said first and second valves are rotatable at an angle up to 20° in any direction with respect to one another.

3. The dry break coupling assembly of claim 1, [wherein said over-center clamp mechanism comprises:

a pair of projecting bars disposed on an outer surface of said first body of said first valve;

a pair of clamp assemblies disposed on said second body of said second valve, each of said clamp assembly including:]

*wherein said clamp includes* a clamp arm, *said end* having a hook end for engaging one of said projecting bars, and

*wherein said over-center clamp mechanism further comprises* a clamp lever for actuating said hook end to engage or disengage said projecting bars.

4. The dry break coupling assembly of claim 3, wherein each of said projecting bars defines a recess for receiving said hook end of said clamp arm.

5. The dry break coupling assembly of claim 3 further comprising a first cap configured to engage said second valve connection end of said second valve when said first and second valves are disposed in the disconnected arrangement, said first cap defining a pair of ridges for receiving said hook ends of said clamp arms of said second valves.

6. The dry break coupling assembly of claim 3 further comprising a second cap configured to engage said first valve connection end of said first valve when said first and second valves are disposed in the disconnected arrangement, said second cap including a pair of clamp assemblies, each clamp assembly including:

a clamp arm having a hook end for engaging one of said projecting bars of said first valve, and a clamp lever for actuating said hook end to engage or disengage said projecting bar.

7. The dry break coupling assembly of claim 1, wherein each of said first and second valves further comprising means for preventing rotation of their respective valve elements from said closed position to said open position when said first and second valves are disposed in said disconnected arrangement, said rotation preventing means of each of said first and second valves structured and arranged for deactivation by operative engagement with the other of said first and second valves when said first and second valves are locked together in said connected arrangement, whereby upon deactivation said rotation preventing means allow rotation of their respective valve elements from said closed position to said open position.

8. The dry break coupling assembly of claim 3 wherein said second valve further comprises a yoke assembly mounted on said second body for locking said clamp levers in said locking position when said first valve element of said first valve is rotated from said closed position to said open position, wherein said yoke assembly comprises a first portion structured to operatively engage and be moved in a first direction by said second valve handle when said second valve element of said second valve is rotated from said closed position to said open position, and wherein said yoke assembly comprises a locking member movable in concert with said first portion, wherein said locking member is structured to engage said clamp lever to prevent further pivoting of said clamp levers when said clamp levers are disposed in said locking position and said first portion is moved in said first direction.

9. The dry break coupling assembly of claim 1, wherein said over-center clamp mechanism includes a first member supported by said first body and a second member supported by said second body, wherein said first member and said second member cooperate to provide limited rotational movement between said first and second valves when disposed in said connected arrangement.

10. The dry break coupling assembly of claim 9, wherein said first member comprises a projecting bar disposed on an outer surface of said first body of said first valve, and said second member comprises a clamp assembly disposed on said second body of said second valve, said clamp assembly including a hook end to engage or disengage said projecting bar.

11. The dry break coupling assembly of claim 1, further comprising a radial seal positioned intermediate said first body and said second body to provide sealing therebetween when said first valve and said second valve are interposed in said connected arrangement.

12. A dry break coupling assembly for interconnecting and controlling fluid flow between first and second components in a fluid handling system, the coupling assembly comprising:

a first valve attachable to the first fluid handling system component, said first valve including:

a first body defining a first valve connection end and a first fluid passageway, a first valve element rotatably supported within said first body, said first valve element rotatable between an open position and a closed position, a first handle operatively connected to said first valve element for rotating said first valve element between said open position and said closed position;

a second valve attachable to the second fluid handling system component, said second valve including:

a second body defining a second valve connection end and a second fluid passageway, a second valve element rotatably supported within said second body, said second valve element rotatable between an open position and a closed position, a second handle operatively connected to said second valve element for rotating said second valve element between said open position and said closed position, wherein said first valve and said second valve are movable relative to each other between a disconnected arrangement and a connected arrangement, wherein said first and second valve connection ends are disposed in facing relationship when said first valve and said second valve are disposed in said connected arrangement;

an over-center clamp mechanism for interlocking said first valve to said second valve when said first valve and said second valve are disposed in said connected arrangement, said over-center clamp *mechanism* being releasable when said first and second valve elements are disposed in the closed position, wherein when said over-center clamp mechanism is released, said first and said second valves are movable into the disconnected arrangement; and wherein said over-center clamp mechanism comprises:

a pair of projecting bars disposed on an outer surface of said first body of said first valve;

a pair of clamp assemblies disposed on said second body of said second valve, each of said clamp assemblies including:

a clamp arm having a hook end for engaging one of said projecting bars, and a clamp lever for actuating said hook end to engage or disengage said projecting bars,

*wherein each of said projecting bars defines a recess for receiving said hook end of said clamp arm, wherein*

*said first and second valves are rotatable with respect to one another when said hook end is disposed in said recess.*

13. The dry break coupling assembly of claim 12, wherein said first and second valves are rotatable with respect to one another when said first valve and said second valve are disposed in said connected arrangement.

14. The dry break coupling assembly of claim 13, wherein said first and second valves are rotatable at an angle up to 20° in any direction with respect to one another.

15. The dry break coupling assembly of claim 12, wherein each of said projecting bars defines a recess for receiving said hook end of said clamp arm.

16. The dry break coupling assembly of claim 12 further comprising a first cap configured to engage said second valve connection end of said second valve when said first and second valves are disposed in the disconnected arrangement, said first cap defining a pair of ridges for receiving said hook ends of said clamp arms of said second valves.

17. The dry break coupling assembly of claim 12 further comprising a second cap configured to engage said first valve connection end of said first valve when said first and second valves are disposed in the disconnected arrangement, said second cap including a pair of clamp assemblies, each clamp assembly including:

a clamp arm having a hook end for engaging one of said projecting bars of said first valve, and a clamp lever for actuating said hook end to engage or disengage said projecting bar.

18. A dry break coupling assembly for interconnecting and controlling fluid flow between first and second components in a fluid handling system, the coupling assembly comprising:

a first valve attachable to the first fluid handling system component, said first valve including:

a first body defining a first valve connection end, a first fluid passageway, and a collar projecting from said first valve connection end, a first valve element rotatably supported within said first body, said first valve element rotatable between an open position and a closed position, a first handle operatively connected to said first valve element for rotating said first valve element between said open position and said closed position;

a second valve attachable to the second fluid handling system component, said second valve including:

a second body defining a second valve connection end, a second fluid passageway, and a valve alignment skirt projecting from said second valve connection end, a second valve element rotatably supported within said second body, said second valve element rotatable between an open position and a closed position, a second handle operatively connected to said second valve element for rotating said second valve element between said open position and said closed position, wherein said first valve and said second valve are movable relative to each other between a disconnected arrangement and a connected arrangement, and said collar is received within said valve alignment skirt when said first valve and said second valve are disposed in said connected arrangement;

an over-center clamp mechanism for interlocking said first valve to said second valve when said first valve and said second valve are disposed in said connected arrangement, said over-center clamp being releasable when said first and second valve elements are disposed in the closed position, wherein when said over-center clamp mechanism is released, said first and said second valves are movable into the disconnected arrangement; and an annular seal provided intermediate said collar and said valve alignment skirt for sealing between said first valve and said second valve when and in connected arrangement.

19. The dry break coupling assembly of claim 18, wherein said first and second valves are rotatable with respect to one another when said first valve and said second valve are disposed in said connected arrangement.

20. The dry break coupling assembly of claim 18, wherein said over-center clamp mechanism includes a first member supported by said first body and a second member supported by said second body, wherein said first member and said second member cooperate to provide limited rotational movement between said first and second valves when disposed in said connected arrangement.

*21. A dry break coupling assembly for interconnecting and controlling fluid flow between first and second components in a fluid handling system, the coupling assembly comprising:*

*a first valve attachable to the first fluid handling system component, said first valve including:*

*a first body defining a first valve connection end and a first fluid passageway,*

*a first valve element rotatably supported within said first body, said first valve element rotatable between an open position and a closed position,*

*a first handle operatively connected to said first valve element for rotating said first valve element between said open position and said closed position;*

*a second valve attachable to the second fluid handling system component, said second valve including:*

*a second body defining a second valve connection end and a second fluid passageway,*

*a second valve element rotatably supported within said second body, said second valve element rotatable between an open position and a closed position,*

*a second handle operatively connected to said second valve element for rotating said second valve element between said open position and said closed position,*

*wherein said first valve and said second valve are movable relative to each other between a disconnected arrangement and a connected arrangement, wherein said first and second valve connection ends are disposed in facing relationship when said first valve and said second valve are disposed in said connected arrangement;*

*an over-center clamp mechanism for interlocking said first valve to said second valve when said first valve and said second valve are disposed in said connected arrangement, said over-center clamp mechanism being releasable when said first and second valve elements are disposed in the closed position, wherein when said over-center clamp mechanism is released, said first and said second valves are movable into the disconnected arrangement; and*

*wherein said first and second valves are rotatable with respect to one another when said first valve and said second valve are disposed in said connected arrangement, wherein said over-center clamp mechanism comprises:*

*a projection disposed over an arcuate outer surface of said first body of said first valve, said projection defining a recess extending along a length of said projection;*

*a clamp disposed on said second body of said second valve, said clamp including an engaging end and a retaining shaft, said engaging end adapted to engage or disen-*

*gage an outer surface of said projection, and said retaining shaft adapted to extend within said recess allowing translation within said recess such that said first and second valves are rotatable with respect to one another when said first valve and said second valve are disposed in said connected arrangement.*

* * * * *